(12) United States Patent
Witter et al.

(10) Patent No.: US 8,491,685 B2
(45) Date of Patent: Jul. 23, 2013

(54) CYCLONIC DUST COLLECTOR WITH VARIABLE SPEED DRIVE AND CONSTANT LOAD CURRENT

(75) Inventors: Robert M. Witter, Syracuse, NY (US); Jeffrey Hill, Cicero, NY (US)

(73) Assignee: Oneida Air Systems Inc., Syracuse, NY (US)

( * ) Notice: Subject to any disclaimer, the term of this patent is extended or adjusted under 35 U.S.C. 154(b) by 223 days.

(21) Appl. No.: 13/029,220

(22) Filed: Feb. 17, 2011

(65) Prior Publication Data
US 2011/0203237 A1   Aug. 25, 2011

Related U.S. Application Data

(60) Provisional application No. 61/306,056, filed on Feb. 19, 2010, provisional application No. 61/315,695, filed on Mar. 19, 2010.

(51) Int. Cl.
*B01D 50/00* (2006.01)

(52) U.S. Cl.
USPC ............. 55/337; 55/428; 55/429; 55/467; 55/471; 55/472; 55/473; 55/356; 55/338; 55/339; 55/340; 55/322; 55/385.1; 55/385.2; 55/DIG. 18; 95/25; 95/26

(58) Field of Classification Search
USPC ............. 55/337, 428, 429, DIG. 18, 467, 55/471–473, 356, 338, 339–340, 322, 385.1, 55/385.2; 95/25–26
See application file for complete search history.

(56) References Cited

U.S. PATENT DOCUMENTS

| 2009/0078120 A1* | 3/2009 | Kummer et al. | 96/222 |
| 2010/0218467 A1* | 9/2010 | Witter | 55/337 |

* cited by examiner

*Primary Examiner* — In Suk Bullock
*Assistant Examiner* — Dung H Bui
(74) *Attorney, Agent, or Firm* — Bernhard P. Molldren, Jr.

(57) ABSTRACT

A dust collection arrangement employs a variable frequency drive to supply AC to its fan motor. A current sensor measures the current drawn by the motor, and this is compared with a preset value. The variable frequency drive adjusts the frequency of the AC applied to the motor to maintain the motor current at the preset level. This keeps the flow of air in the system optimal as dust producing tools are added or taken off.

6 Claims, 5 Drawing Sheets

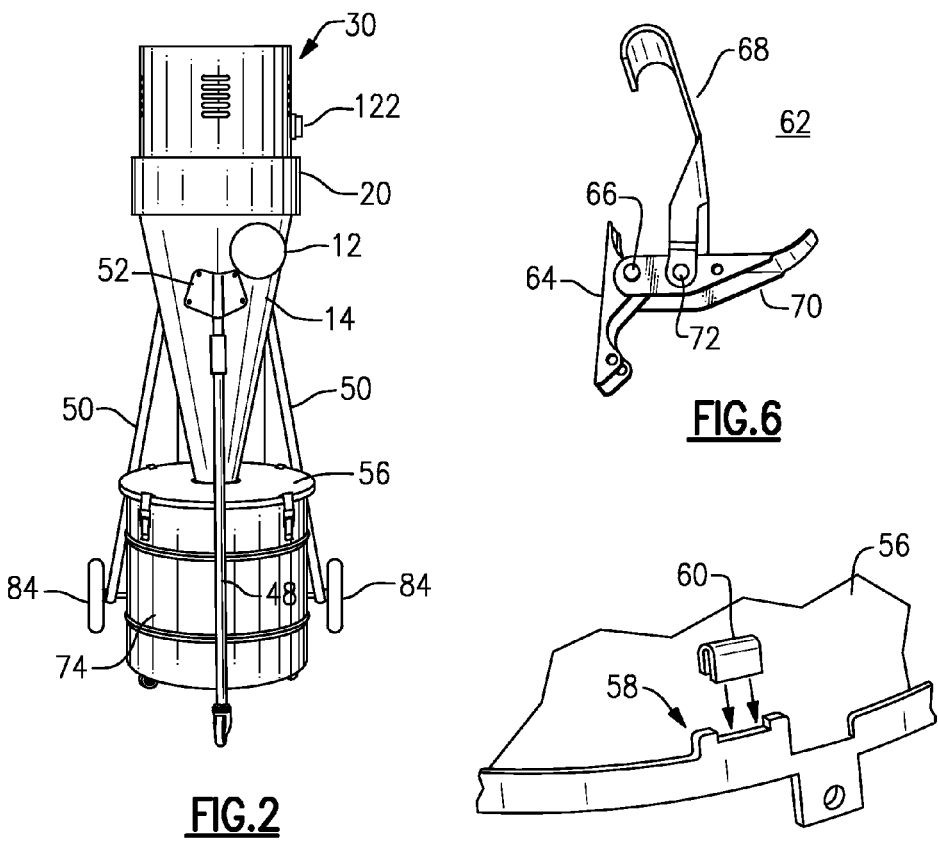
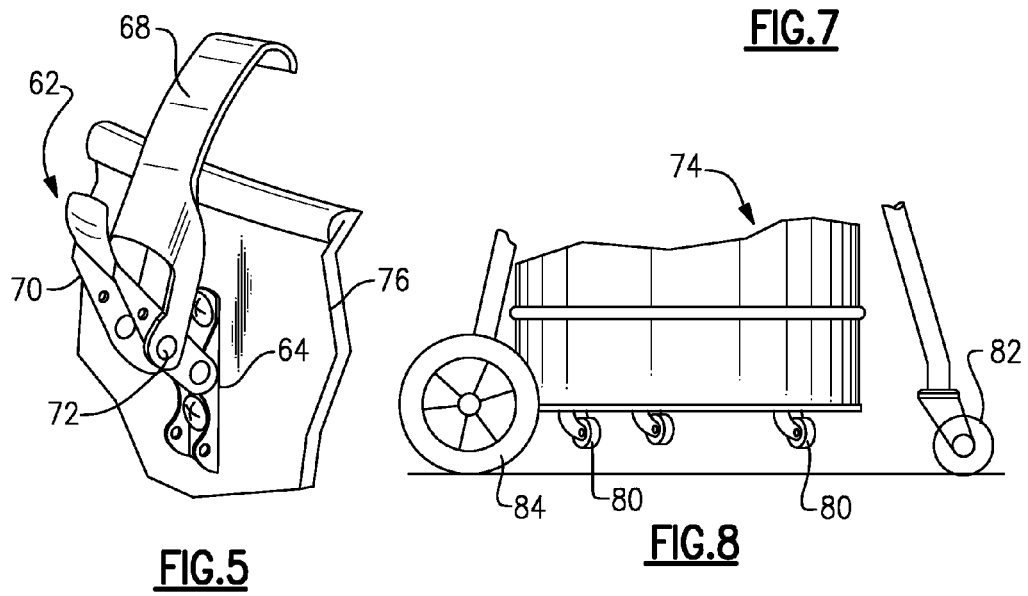

CYCLONIC DUST COLLECTOR WITH VARIABLE SPEED DRIVE AND CONSTANT LOAD CURRENT

This application claims priority under 35 U.S.C. 119(e) of Provisional Patent Applications. 61/306,056, filed Feb. 19, 2010 and 61/315,695, filed Mar. 19, 2010. The disclosure therein is incorporated here by reference.

BACKGROUND OF THE INVENTION

This invention is directed to a dust collection system as used in cabinetmaking, carpentry and similar trades, or in any industrial setting in which process dust is generated and needs to be controlled. In some cases, flammable process dust is generated and can create risk of fire or explosion. In the dust collection system, the process dust is directed from dust producing equipment to a dust storage drum and the airflow is separated from the dust is returned to the ambient. In favorable embodiments, the dust collection system may involve a cyclonic dust separator, followed by a HEPA filter or similar final air filter.

The invention is more specifically directed to a dust separator in which the motor that drives the blower or impeller automatically adjusts rotation speed to match the air flow demand and matches the impedance to air flow imposed by the dust producing tools and ducts or hoses to which it is attached, so that the dust separation is optimized. This is most favorably achieved with a variable frequency motor drive and a motor load current feedback control.

The invention is also directed to dust collector systems with a feature for suppressing or arresting flame that may come about by inadvertent ignition of the dust in the process air stream, so as to prevent deflagration and keep flame from igniting dust in the ambient air.

The invention is furthermore directed to a Vee design cyclonic dust collector in which the cyclonic chamber involves a single cone with the intake of air and process dust entering through a penetration in the conic wall, with the process dust separating and descending, leaving the lower nose end of the cone, and with the air leaving the cone through a vortex tube that penetrates a divider plate at the top of the conic body. A fan chamber then is positioned atop the divider plate and conic body, generally rising from the top of the conic body (or slightly outside the radius of the top of the conic body). The fan in the chamber impels the airflow through a ductway to a final filter, and from there the filtered air returns to the ambient. The Vee design of the cyclonic separator has advantages in manufacturing costs and in separation efficiency.

Factories, home workshops, and other operations that utilize cutting tools (e.g., for wood, metal, or plastic) or some other type of debris-producing machinery generally need to incorporate a dust collection or air cleaning system to ensure safe working conditions, quality machining, good air quality, and to satisfy certain government environmental and safety regulations. Typically, debris-producing machines have a vacuum hose attached to a dust port that is located in close proximity to the cutting or grinding operation that is used to entrain and extract the debris, i.e., wood chips, filings and fines produced by the machine. The production dust is carried away through a conduit or flexible tubing and eventually into to the dust collector.

These operations typically have a range of processing tools that are used selectively as needed and are not all operated simultaneously. For example, there may be twelve processing machines where at times just a few, or perhaps only one machine is operated and at other times most or all of the machines may be operated. These machines can require significantly different air volumes and pressures to effectively extract material and entrain debris into the system. They also have a plurality of different dust ports sizes (diameters) and highly variable dust collection requirements. For example, a 20-inch wood planer may have a six-inch-diameter dust collection port and may require 800 CFM at 8 inches static pressure (measured in terms of water column). On the other hand, a small CNC router may require 250 CFM at 23 inches of static pressure measured in water column, and may have a 2½" dust port. Currently, two separate and independent dust collection systems of different design types would be required to meet these specifications. Furthermore, it is not uncommon for manufacturers to have poorly designed or undersized dust ports integrated into the machine, requiring much higher pressures and velocities than is recommended to meet the best-practice standard.

If the amperage load on the blower motor decreases, the impeller speed would need to increase to restore a full-load motor condition. Alternatively, the inverse is true. If dust conduit lengths are increased or different ports sizes are opened and closed, the motor load changes as well. However, at present it has not been possible to automatically adjust motor speed to accommodate changing conditions.

It is also quite important that velocity of the air in the ducts should not fall below minimum conveying velocities. The need for this is twofold:

a) When material is conveyed in a pipe or duct air velocity must be maintained at or above a minimum speed (contingent on the density of the conveyed material) or material will drop out of the airstream, clogging the duct. Larger collectors that collect from a plurality of variable duct and ports sizes are unable to maintain sufficient conveying velocities and lack flexibility of volume and pressure capability to alternate between high volume and low pressure to high pressure and lower volume requirements to overcome higher friction losses in smaller diameter ducts, dust ports and hoses b) Also, air-to-dust ratios (concentration level of air to dust) of finely divided material is an important consideration for combustible dusts in maintaining a mixture concentration that is below the Lower Flammability Limit (LFL) to prevent a hazard of fire or deflagration. Lower Flammability Limit (LFL) is the point of concentration where the dust component of the dust-air mixture is just sufficient to support combustion if a spark or ignition source enters the duct system. For Example, the LFL for finely divided wood dust is 40 grams per cubic meter, or 1.133 g/cu ft. A concentration below 40 grams per cubic meter will not deflagrate or combust.

Problems exist in the current state of the art where a dust collection radial fan blower, of the type used in material conveying systems, delivers a pressure-to-volume characteristic that is a well-defined single function or curve on a X-axis/Y-axis chart, considered where impeller speeds are constant. These radial fan blowers are designed for a narrow band of airflows and pressure ranges. The drawbacks of this design are numerous, as the air flow demand can easily go outside the design airflow band of the blower. This occurs when tools are added to, or taken off the system.

Direct-drive radial fans (which are often used in dust collection equipment) move less air as the inlets and outlets are restricted, resulting in less work performed and less amperage draw on the motor. For example, a motor that is rated with Full Load Amps (FLA) at 20 amperes may only draw 10 amperes after pipe and ductwork is added to the system. In that case, since the motor cannot be electrically overloaded and operate at more than 20 amperes, the system must be set up from the factory to limit current draw in a non-loaded condition. Also, any addition of ductwork or dust conduit reduces the work efficiency of the system. In the foregoing example, the efficiency is reduced by one-half.

System air friction, i.e., air handling losses, increase with longer duct runs, multiple branches, transitions, elbows, smaller dust inlet ports, flexible hose, loading pressure losses across the filter media, and other restrictions. Because of these impairments to air flow, the fan air flow performance is reduced and the work capacity of the system is decreased. Piping or duct systems used to convey waste matter and air to the dust collector are highly variable in the field. For example, tapered main duct designs are used for systems connecting to multiple processing machines. In such a system a multitude of smaller ducts empty into fewer progressively larger ducts as an attempt to maintain a generally constant conveying velocity throughout the conduit system. The system achieves this, in theory, by keeping an equal cross sectional area of the ductwork for each segment that the air passes through. For smaller portable or stand alone applications, a flexible ducting or flex hose is frequently used for the various tools. The flex hoses are connected, in turn, to many dust ports of varying size for the different tools. Any increase in pipe length or decrease of pipe diameters will result in increased friction loss and reduced airflow. The resulting drop in flow efficiency decreases the amperage draw and this reduces the output power available from the motor.

As mentioned before, in any woodshop environment or in any industrial environment where the process dust involves flammable materials, some measure must be taken for suppressing or arresting flame that may result from inadvertent ignition of the dust in the process air stream.

A flame arrester, deflagration arrester, or flame trap is a piece of equipment installed in an industrial process to stop the propagation of a deflagration traveling along a pipeline by extinguishing the flame. Flame arresters are used on storage tank vents, fuel gas pipelines, storage cabinets, the exhaust system of internal combustion engines, Davy lamps and ovenproof drums.

A flame arrester functions by forcing a flame front through channels that are too narrow to permit the continuance of a flame. The reduced heat of combustion extinguishes the flame from a deflagration, not allowing it to exit the device where it could ignite a secondary deflagration. These passages can be regular, like wire mesh, or irregular, such as those in random packing or tight screening where the heat from the flame propagation is conducted to the metal screen or mesh lowering the heat output and containing the flame front.

The problems that the present invention is directed to concerns deflagrations that may occur in dust collection systems that use filters, (typically pleated cartridge filters) and which may result from dust extracted from dust generating tools and processes. Flammable dust in suspension when ignited can deflagrate or burn quickly producing flame propagation radiating out from the source of combustion. The objective here is to eliminate or reduce flame propagation from a deflagration that is vented through a filter (typically a pleated cartridge filter). The embodiments of this invention lend themselves well to cyclone-style collectors (but are not limited to this style) where the cyclone-collected material drops into a collection drum and the separated air flows to a secondary filter and exits to ambient air. The conventional technique employs a semi-passive system where the deflagration has to be diverted through a pressure panel or controlled gate to a flame-quenching or flame-squelching device (i.e., "quelching"). This can be very expensive and complex, requiring gates, dampers, and/or abort gates that have to be timed electronically to actuate within small fractions of a second. Cyclone systems are particularly difficult to adapt to the conventional technique because the flame from a deflagration must be diverted, but at the same time the outlet flow from the system must be simultaneously blocked off. Conventional anti-deflagration systems require complex and expensive sensors and controls, with elaborate engineering control equipment.

OBJECTS AND SUMMARY OF THE INVENTION

It is an object of this invention to provide a dust collection system that avoids the drawbacks of the prior art, as mentioned just above.

It is one particular object to provide a dust collection system in which the air flow adjusts automatically in response to changes in demand and to changes in the air flow impedance from the dust-producing tools and ductwork, to maintain the separator system at an optimum efficiency.

It is a more specific object to provide a cyclonic dust separator system in which the fan motor for the system fan blower is provided with alternating current (AC) drive current that adjusts automatically in drive frequency to maintain a design current draw for the motor.

It is another object to provide the cyclonic dust separator with a drive current generator that can plug in to standard single phase or multiple phase line power.

It is a further object to provide a dust collector system with a flame arrester or deflagration arrester that successfully controls any deflagration within the dust collection system without requiring special controls and without impeding air flow through the system.

It is a still further object to provide a flame arrester or deflagration arrester design that is simple and inexpensive, yet highly effective in creating a safe environment.

Another object is to provide a portable dust collector in which the dust collection barrel or drum can be easily emptied and replaced, and where the dust barrel remains on the unit and does not interfere with moving the dust collection system around from place to place.

A yet further object is to provide a cyclonic separator design that reduces manufacture costs, while maintaining or enhancing separation efficiency.

According to one aspect of this invention, a dust collection arrangement involves a dust separator of the type that has an inlet port to which ducting is connected to bring a flow of air and entrained dust from one or more dust-producing tools, and a separator mechanism (such as a cyclonic separator) for separating the dust from the air flow, so that the dust is deposited into a dust collection container, e.g., a drum or barrel. An exhaust port of the separator discharges the exhaust airflow, e.g., through a final filter. A rotary impeller induces air flow through the ducting into and through the dust separator, and out the exhaust port. This impeller is rotated by an AC drive motor. In the embodiments of this invention, a variable speed drive supplies the drive current to the motor. In an embodiment, the variable speed drive has an AC inlet receiving alternating current (AC) line power, and power outputs providing single phase or polyphase power to the AC motor. A control circuit varies the drive frequency of the applied AC drive power from the variable speed drive. This control circuit includes a sensor to detect the motor current draw, i.e., the amount of current being supplied from the variable speed drive to said AC motor. A feedback mechanism associated with the current sensor and the variable speed drive control circuit ensures that the control circuit adjusts the frequency of the power provided from the variable speed drive on the basis of amount of current detected by said current sensor, so as to increase or decrease the frequency as need be to maintain the current at a predetermined current level.

The variable speed drive configured in this way is particularly useful when applied to the blower motor for the impeller of a cyclonic separator of the type described. Most favorably, a polyphase motor, i.e., three-phase AC induction motor is used as the impeller drive motor, and the variable speed drive is designed to receive single-phase AC line power and send three-phase AC power to the motor.

According to another aspect of this invention, a deflagration suppressor or flame arrester feature is incorporated into a dust collection system. The dust collection system receives process dust that is entrained in an air stream, and the air stream is passed from a separator, in which the dust is separated and deposited into a dust collection container, and the air flow passes through a final filter back into the ambient air. In this invention, the flame arrester is positioned downstream of the separator, just in advance of, or just after, the final filter. The flame arrester defines a multiplicity of narrow channels that permit exhaust of the process air flow but block any flame front. The flame arrester is formed of a sheath of a porous metal material capable of absorbing the heat of a deflagration and preventing a burst of flame from passing through it. The sheath may formed of wire mesh screen, and/or may be formed of porous metal material having good heat conduction. This can be a screen of moderate mesh size, and may include a support frame of a wider mesh. The metal is a good conductor of heat and absorbs the combustion heat of the flame front, so that any flame does not exist outside the mesh screen, but is stopped at the screen. In one preferred embodiment, the flame arrester is wrapped on the exterior of a pleated cylindrical cartridge filter. A grounding wire can attach to the metal screen and to a suitable grounding point on the separator to manage any static charge.

According to a further aspect of the invention, the cyclonic dust collector is of a Vee construction, as generally illustrated, in which the cyclonic chamber is formed in a conic body. That is, the cyclone conic body has a conic wall, with an upper divider plate closing off an upper end of the conic body. The divider plate has a central passage and a vortex tube descending from the central passage. The conic body also has a narrow nose at a lower end of the conic wall. The upper divider plate and the lower nose define the cyclonic chamber within the conic body.

The air inlet conduit penetrates the conic wall just below said divider plate, to introduce the airflow with entrained dust particles. A fan chamber with a generally annular side wall is generally coextensive with the divider plate at the top end of the conic body. The annular side wall extends circumferentially over the upper end of the conic body, and a top plate closes off the side wall. The fan chamber is mounted atop the conic body, and the a fan or impeller is situated within the fan chamber. The fan or impeller rotates to induce the airflow from the air inlet conduit into cyclonic chamber, through said vortex tube and into the fan chamber. An air outlet duct conducts the leaving air flow from the fan chamber, and the air outlet duct exiting through a penetration in the fan chamber. The fan motor may be direct drive and may be supported on the fan chamber top plate.

A dust barrel is positioned below the nose of the conic body and has a lid or cover that closes off a top of the dust barrel. The lid has a central dust inlet opening, with a tubular boot, or other suitable coupling member, joins the nose of the conic body to the inlet opening of the lid. The dust that separates from the air flow in said cyclonic chamber drops out the nose and into the dust collection barrel.

Favorably, the air outlet ductway carries the flow of air leaving the fan chamber to a final filter, which may be a HEPA cartridge filter, and which may include the flame arrester screen discussed earlier.

The dust separation and collection system may include a frame resting (e.g., with feet, wheels, or casters, for example) on a workspace floor, with the frame supporting the conic body above the dust collection barrel. The support frame may be in the form of a tripod having feet (e.g., wheels or casters) resting on the shop floor. In a favorable embodiment, the conic body has an apex angle of about 23 degrees for optimal performance and separation.

These embodiments of the cyclonic dust collector may have a Vee design, which is simpler and more economical to manufacture, and provides better dust separation than a traditional cone-and-barrel design of a cyclonic separator. In this arrangement the separator is in the form of a conic body having a conic wall, and with an upper divider plate that closes off an upper end of the conic body. The divider plate has a central passage and a vortex tube descends from the central passage into the cyclone chamber. The conic body has a narrow nose at its lower end. The conic body with the upper divider plate and the lower nose define the cyclonic chamber within the conic body. An air inlet conduit or inlet duct penetrates the conic wall below the divider plate to introduce the air flow into the cyclonic chamber. Above this, there is a fan chamber with a housing formed of a generally annular side wall that extends circumferentially and has a top plate or motor plate that closes off the housing. The fan chamber housing is mounted e.g., with bolts, gaskets, etc. to the top of the conic body. A vertical shaft radial flow fan is disposed in the fan chamber and serves to induce the flow of air from the air inlet conduit into the cyclonic chamber, and through the vortex tube into the fan chamber, from whence it is discharge via an air outlet duct. A dust receptacle, e.g., dust barrel, is positioned below the nose and its top or lid closes off the dust receptacle. A tubular boot or coupling joins the nose of the conic body to the inlet opening of the lid, and the dust that separates from the air flow in said cyclonic chamber drops out from the cone nose into the dust collection barrel.

The fan may be directly driven, with a fan motor or blower motor being supported on the fan chamber top plate. This may have a "smart" variable speed drive for optimal performance, as discussed earlier. In some possible embodiments, there may be a vacuum source downstream of the final filter.

In the preferred embodiment, the outlet duct conducts the flow of air from the fan chamber into a final filter, which may be in the form of a HEPA cartridge filter, and which may have a flame arrester screen as disclosed.

A frame resting on a workspace floor supports the separator conic body above the dust collection barrel. The frame may take the form of a tripod having feet resting on the floor. In portable versions, there may be wheels or casters on the feet of the tripod.

In a preferred embodiment, the lid for the dust collection barrel is mounted onto the support frame below the dust separation unit with the nose of the dust separator attached to the center opening of the lid, so that the lid is supported at a fixed elevation above the surface of the shop floor and higher than the top or rim of the dust collection barrel. This creates a space or clearance between the rim of the dust collection barrel and the lid. The barrel or drum, supported on casters, can be rolled into place under the rim, and can be rolled out for emptying. Latch elements are positioned at intervals around the upper part of the barrel side wall, and these engage corresponding structure around the lid. These latch elements are operative to close and pull the barrel upwards with the rim against the under side of the lid and with the casters of the dust collection barrel lifted off the floor surface. The latch members are also operative to lower the barrel when they open and release it, so that the barrel may be rolled from under said lid for emptying the contents of the dust collection barrel. Favorably, the latch elements are an over-center latches and each has a mount or base portion affixed onto the barrel side wall, a latch hook portion engaging the lid, and a toggle arm pivoted on the base or mount portion to move and secure the latch hook portion to the barrel lid. In alternative embodiments, the latch members could be mounted on the barrel rim periphery, and may engage engaging structure on the barrel side wall.

The lid can have raised rim structure, e.g., a plurality of tabs formed on the lid periphery, for engaging respective ones of the latch elements. Favorably, each of tabs may have a protective or cushion insert of a durable resilient synthetic material, for engaging the latch hook portion of the respective latch element. Once the barrel is lifted with the casters off the shop floor surface, the entire dust collector arrangement can be rolled and moved about, as desired, without the casters striking or rolling into items on the floor, such as wood chips, power cords, hoses, or tools.

The above and other features and advantages of the invention will become apparent from the ensuing description of the preferred embodiment(s), as discussed with reference to the appended figures of Drawing.

DESCRIPTION OF THE DRAWING

FIG. 2 is a front elevation thereof.

FIG. 5 illustrates one of the barrel lid clamps or latches of this embodiment.

FIG. 6 is a perspective view showing the closing action thereof.

FIG. 7 is a perspective view of a portion of the barrel lid showing one latch tab.

FIG. 8 is a partial side elevation of the support frame and dust collection barrel.

DESCRIPTION OF A PREFERRED EMBODIMENT

Figure 1:
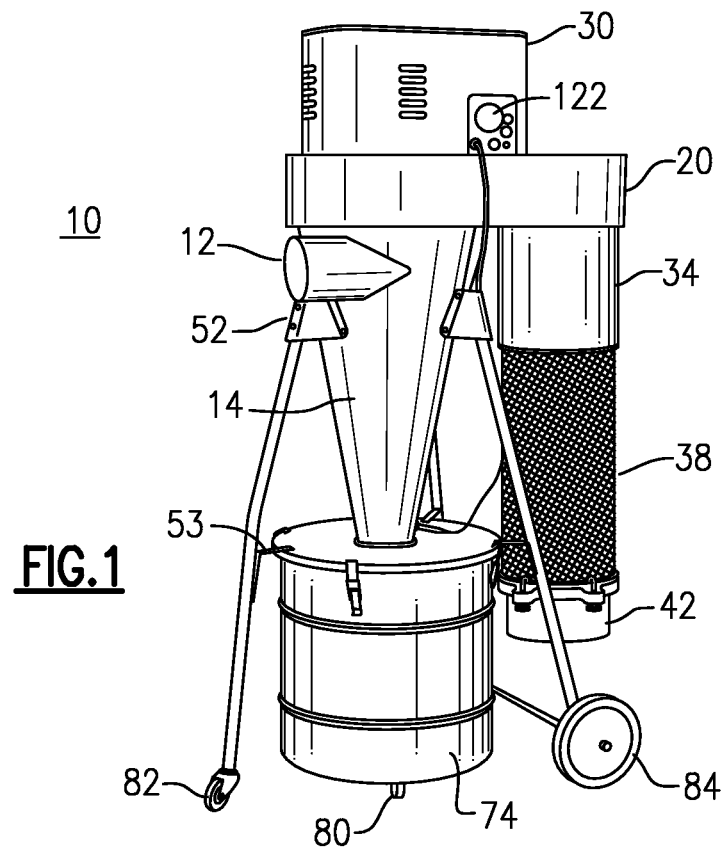
FIG. 1 is a perspective illustration of an overall dust collector arrangement that embodies this invention.
Figure 1A:
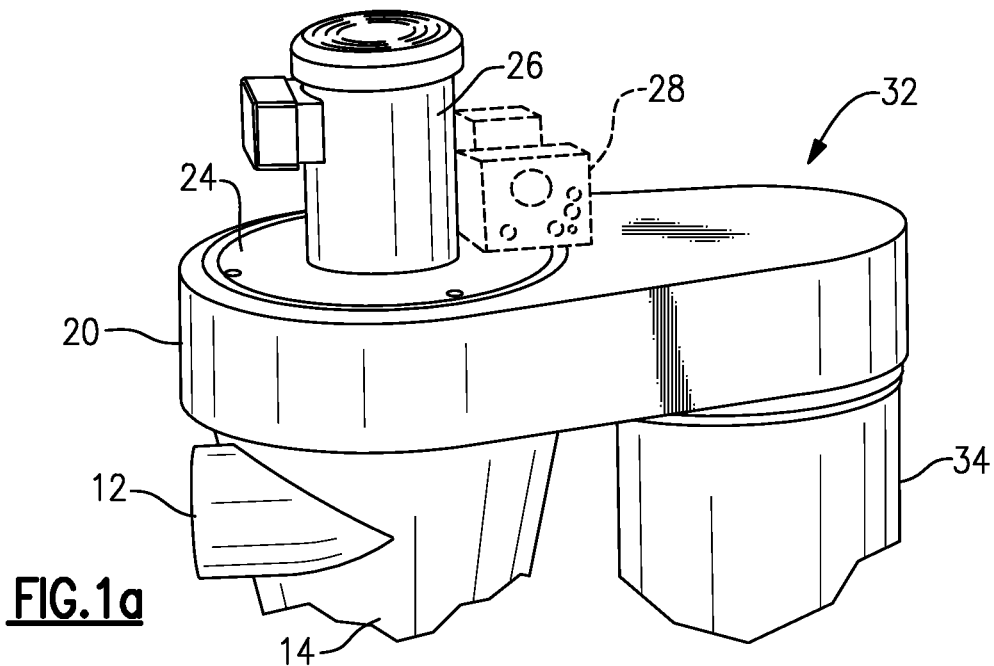
FIG. 1A is a partial perspective view of the upper portion thereof, with motor cowling removed.

With reference to the Drawing, and initially to FIGS. 1, 1a, and 2, a portable cyclonic dust collector 10 is provided with an intake duct 12 that penetrates a conic separator body 14 which is of a conic shape, and having a conic wall that extends from a lower nose 15 to a divider plate 16 (shown in FIG. 4) at the top of the conic wall, so that a cyclonic separation chamber is defined within the conic body between to lower nose 15 and the upper or divider plate 16. A vortex tube 18 descends from a central opening of the divider plate 16 for a distance into the cyclonic separation chamber.

Figure 3:
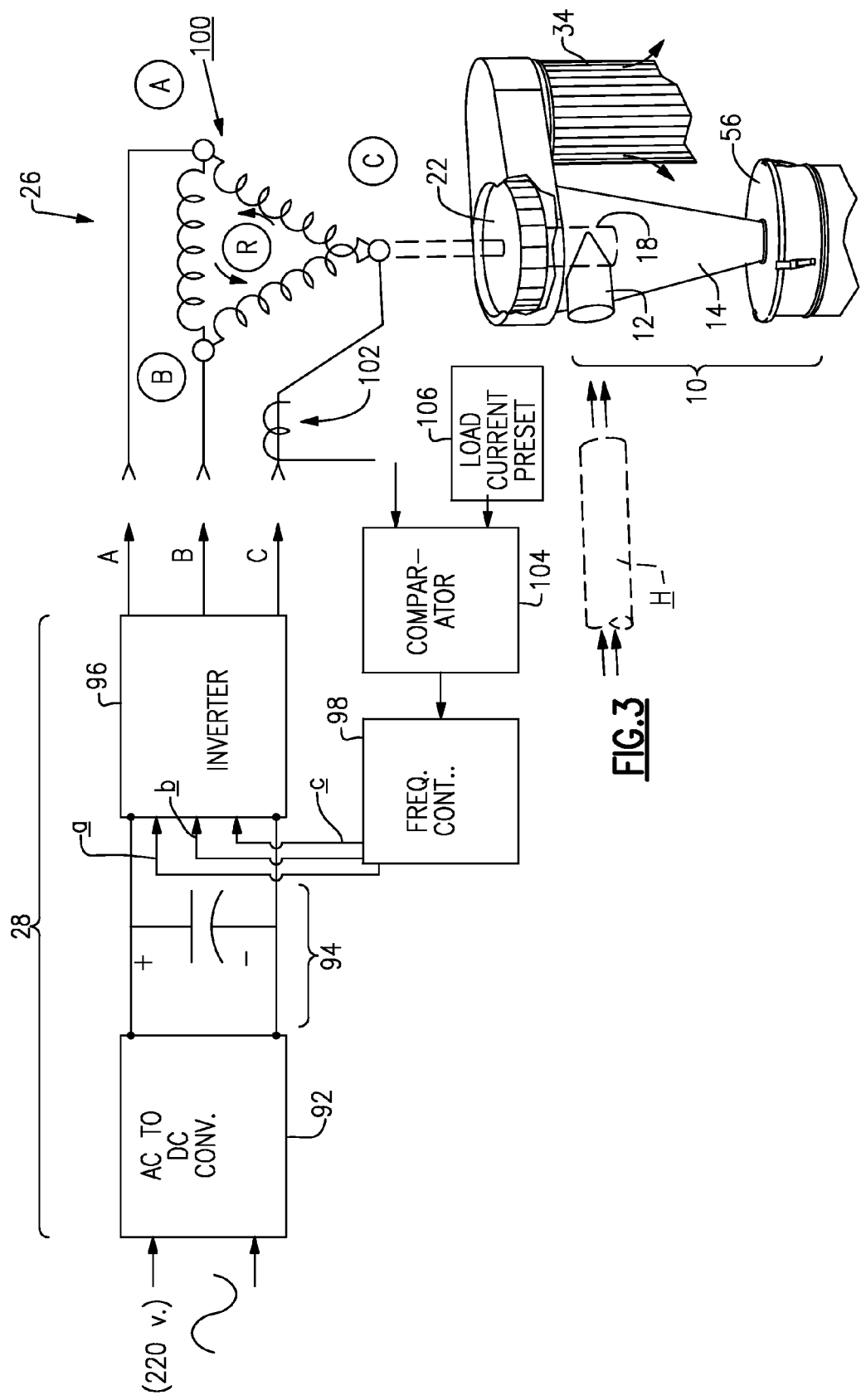
FIG. 3 is a schematic diagram for explaining the operation of one embodiment.

A fan housing 20 is situated above the conic body 14, and contains a rotary radial fan 22 with a vertical axis centered on the axis of the body 14 and vortex tube 18. A motor plate 24 closes off the top of the fan housing 20, and supports a vertical-shaft drive motor 26 for the fan 22, which in a preferred embodiment is a three-phase AC induction motor. A motor drive circuit 28, as explained below with reference to FIG. 3, provides drive current to the motor 26, in which the AC frequency is adjusted to match the needs for the air flow induced by the fan. In this embodiment, there is a motor cowling or cover 30 provided as a sheath to protect the motor from dust or physical damage.

The fan housing 20 has a generally oval circumferential side wall and is closed off by the divider plate 16 and the fan motor plate 24, so that the air that is drawn by the impeller, through the inlet duct 12 and cyclone conic separator body 14 is forced into an elongated rear end of the fan housing 20 that serves as an outlet duct 32. From there the air flow from the fan flows downward, through a first, generally cylindrical silencer 34, past a drop in second foam silencer 36 into a HEPA final filter 38, here in the form of a filter cartridge. In this embodiment, the filter cartridge 38 is provided with a flame arrester sheath, as will be explained later. A bottom bracket 40 retains the filter 38 in place, and also supports a dust collector cup 42 (which retains the dust that is blown off the internal surfaces of the filter), and this is retained with threaded J-hooks 43. An internal threaded rod 44 or rods extends from the outlet duct 32 portion of the housing down through the axis of the silencers 34 and 36 and the final filter 38 into the bottom bracket 40 to hold the filter assembly in place.

A support frame or carriage 46, provided as a tripod in this embodiment, supports the cyclonic separator conic body 14 vertically above the shop floor, and is formed of a front leg 48 and a pair of rear legs 50, 50. There are upper leg gussets 52 that mount the top ends of the respective legs 28, 50, 50. The gussets may be bolted or welded in place to the conic body. Below the level of the nose 15 of the conic body there are drum lid brackets 53 and 54 that attach to the front and rear legs, respectively, and are also affixed to a drum lid 56. There is a central opening in the drum lid 56 that is affixed to the nose 15 of the conic body 14, such that any dust separated in the cyclonic separator descends out the nose 15 and through the lid 56, into a dust collection barrel, as discussed just below, which is supported off the shop floor surface.

Along the rim of the lid 56, at ninety-degree intervals, are four tabs 58 that project up a short distance, each of which has a lid clamp guard 60, formed of a hard rubber or similar resilient material, set in place on the respective tab.

As shown in more detail in FIGS. 5 and 6, over-center clamps or latches 62 are provided to hold the dust collection barrel onto the barrel lid 56. Each of these has a latch base 64 with a first pivot pin 66. A spring hook latch member 68 has a rounded hook portion at a free end that fits over a respective clamp tab 48 on the lid. A clamp release lever 70 is journaled on the first pivot pin 66 to the base 64, and is also joined by a second pivot pin 72 to the hook latch member 68.

A generally cylindrical dust collection barrel 74 has a cylindrical side wall 76 and a bottom 78, and a rim at its open upper end. The latches 72 have their bases 64 attached onto the upper part of the barrel side wall 76, so that the latches will engage the respective lid tabs 58, and compress the barrel rim against an under side of the lid.

There are three or more casters 80 affixed onto the base of the dust collection barrel 74 to allow the barrel to roll into place beneath the lid, and to allow the barrel to be rolled away when the dust in the barrel needs to be emptied.

In this embodiment, there is a roller 82 at the lower end of the support frame front leg 48 and a pair of wheels 84 at the lower ends of the rear legs 50, 50. In this case, the wheels 84 are mounted to a threaded axle 86 journaled to the lower ends of the rear legs 50, 50, and a tubular (plastic) axle protector 88 may be present on the portion of the axle 86 between the two rear legs.

Returning now to FIG. 3, the a cyclonic dust separator 10 may have ductwork or hoses H connected from various dust producing tools, i.e., saws, sanders, planers, etc., to its intake port or duct 12. The load on the rotary fan or impeller 22 depends on the diameter of the ducts, i.e., pipes or hoses, as well as the lengths of the pipes and hoses and other factors. The fan load can also vary with environmental conditions (i.e., ambient air pressures, etc.) For a large duct, e.g., 6" from a saw or planer, the motor 26 draws its design current (e.g., 20A) to generate the proper air flow. For a smaller duct, e.g., 3" from a sander, the mechanical load is much smaller, so the reverse emf is higher, resulting in the load current being much smaller (e.g., 10A). The solution here is to increase the motor speed to achieve the proper air flow. This is done by sensing motor current draw, and changing the applied power frequency upwardly when the load current drops, or reducing the power frequency when the motor current rises. The variation of resistance to air flow demands a decrease or increase of the fan or impeller speed. In embodiments of this invention, amperage, i.e., motor current draw, is always kept constant and pressure and airflow rates are infinitely variable, within a range. This allows the dust collector to adjust automatically to changing load conditions, avoiding the shortcomings of the state-of-art systems.

In a preferred embodiment, the drive motor 26 is in the form of a three-phase induction motor. In other embodiments, a single-phase induction motor may be used. The drive current is applied from a three-phase variable frequency drive (VFD) 90 as phase legs A, B, and C. This VFD 90 typically has a rectifier 92 supplied with commercial sixty-Hz line current. A DC rail 94, i.e., a DC section involving a pair of storage capacitors, provides DC power to a three-phase inverter section 96. A controller 98 generates the drive pulses a, b, and c for the inverter section 96. The load current to the motor winding(s) 100 is sensed by a current sensor device 102, and this sends a current level signal to the motor controller, where it is compared in a comparator module 104 with a current preset value 106. If the motor current is below the preset, the drive frequency is increased. If the motor current is above the preset, the drive frequency is decreased. The result is the motor speed (and impeller speed) are changed as need be (within some limits) to keep the current at the preset level (e.g., at 20A). As a practical matter, with 60 Hz line power, the motor drive current wave can have a frequency range of 50 Hz to 85 Hz. In a European 50 Hz power system, these limits would be adjusted accordingly.

Variable speed or variable frequency drives are well known. However, this specific application monitors motor current, and the motor drive current frequency is changed to keep load current at a preset level, i.e., a constant current draw. This is advantageous where an airflow has to be matched to changes in an intake, such that the air flow automatically matches changes in the intake duct resistance to air flow, such as for a change in duct diameter. That is, the motor speeds up or slows down as needed to obtain the proper airflow, with the operator having to make any adjustments to the motor current supply.

The invention can be particularly advantageous for smaller stand alone or portable cyclonic systems that are applied to a range of different dust producing tools that have a variety of different air volume and pressure requirements to effectively entrain and extract dust from a cutting or grinding operation into a pipe or flexible hose, so that the airflow and entrained dust are then conveyed back to the dust collection system.

The smart collector of this invention solves these problems (as described above) with one dust collection system that will adapt to many different pressure and volume situations. The smart dust collector delivers pressure vs. volume (within parameters) as described by an infinitely variable set of curves defined on a X axis, Y axis graph, where impeller speed is variable. This system can meet the requirements of a number of different processing machines with a wide variety of extraction requirements. The smart collector can deliver increased pressure and correspondingly less airflow as needed for smaller hose diameters or a high air flow and lower pressure, as needed. The smart dust collector is concerned with an electrical controller that maintains a constant load condition on the motor used in conjunction with a radial fan or impeller, which increases or decreases motor rpm depending on the load or restriction of air on the inlet or outlet of the fan blower.

Additionally, the smart collector provides for a dust collection system so that the velocity of the air in the ducts does not fall below minimum conveying velocities, thus avoiding problems of clogging or possible exceeding LFL limits which could lead to deflagration problems.

At higher speeds, an inexpensive resin-based impeller or fan wheel may suffer from lifting or distortion and may start rubbing against the separator housing. For that reason, an aluminum wheel or impeller is preferred, which can be more easily balanced and which is less likely to distort.

The dust separator of this embodiment uses a Vee design cyclone 14, shown in FIG. 2. The entire cyclonic chamber is conic in shape, with the intake duct 12 penetrating the conic wall near the top. The vortex tube 16, through which the air flow leaves, extends a short way from the top down into the conic chamber 14. This design has advantages over a standard cone and barrel design, in which the upper part of the cyclone is cylindrical in shape, with the vortex tube being within the cylindrical barrel portion, and with the intake tube penetrating the cylindrical wall of the upper, barrel portion. The Vee design separator of this invention achieves superior dust separation, and its simpler construction admits of fewer welds and seams, leading to lower manufacturing costs. The fan housing 20 and motor housing 30, with its exhaust porting, all mounted above the conic body of the separator, can be designed optimally to a given application.

In the preferred embodiments, of which the described embodiment is an example, the dust collection barrel 74 lifts clear of the shop floor surface when it is clamped to the lid 56. The lid 56 is affixed onto the support frame at a level that defines a small clearance over the rim of the barrel 74, so that the barrel may be simply rolled into place on its casters 80. The clamps or latches 62 have sufficient reach that they will fit over the respective lid tabs 58 and clamp guards 60. When the latches are closed, they lift the barrel 74 up to close the rim against the lid 56. Favorably, there is a gasket or sealing ring on the lower surface of the lid 56 to make an air-tight seal against the rim of the barrel 74. The clamps or latches 76 thus elevate the barrel so that the casters 80 are clear of the shop floor surface. This allows the entire dust collector assembly 10 to be rolled on the wheels 84 and roller 82, without the casters 80 catching on obstructions such as power cords, wood chunks, debris, or other items that may be present on the shop floor. When the barrel becomes full, it may be lowered for emptying by simply opening the four latches 62.

A important feature of the dust collector of this embodiment is that flame arrester is actually located downstream of the fan exhaust flow, before or after the final filter. The flame quelching actually occurs in the outlet air flow of the system. The process air flow passes through suitable wire mesh, screen, perforated plate, metal packing, or other flame trapping material and is at all times operating actually in the air process flow path. No other venting is needed, and all air escaping the system is unavoidably captured through this single outlet. A conventional simple weighted back draft damper may be used to keep air from passing out the inlet of the duct collector back towards the dust-creating tool.

This invention accomplishes the same desired result as the aforementioned prior techniques, but at a fraction of the cost. In the case in which the flame quelching screen is disposed the after the secondary or final filter, the collected particulate matter is already filtered out from the air stream and cannot escape through porous holes in the flame front. This passively eliminates the flame propagation.

Figure 10:
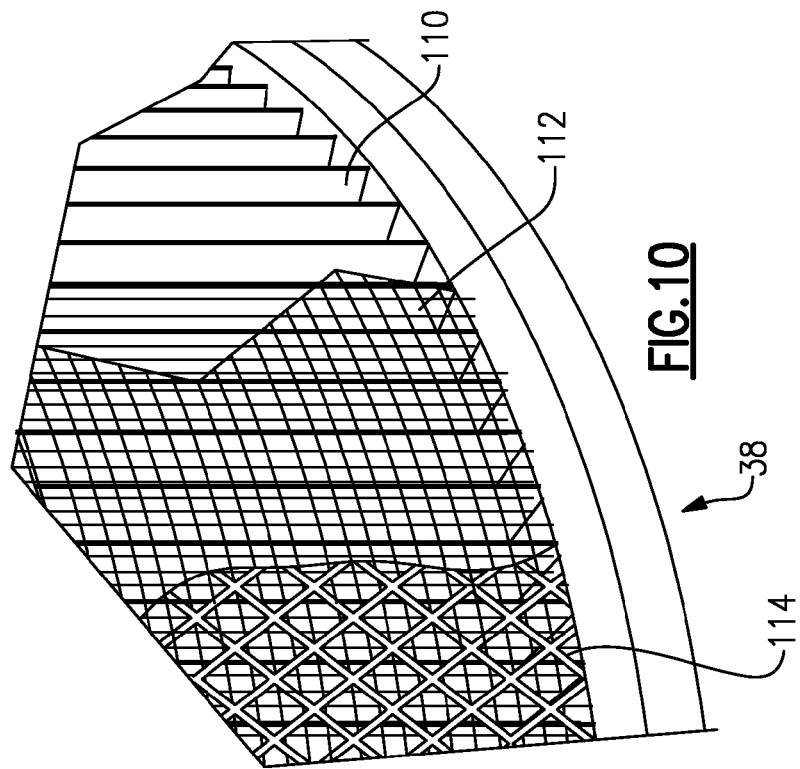
FIG. 10 is another perspective view of the final filter of this embodiment with a portion of the metal mesh sheath or cover and protective cage cut away to show the pleated filter media behind the mesh sheath.

The final filter 38 in this embodiment is a generally cylindrical pleated-media cartridge filter, with upper and lower seal rings, pleated filter media surrounding a hollow interior core, and a sheath or cover on the outer surface of the media. Here the sheath is formed of a woven metal wire screen or mesh. The metal material should be a good conductor of heat, so as to absorb the heat of any flame or deflagration that might escape on the air path through the filter media. Some detail of this woven mesh material is illustrated in the inset of FIG. 10. The mesh has numerous open pores or openings between the wires to permit free flow of exhaust air that leaves the filter. On the other hand, there is sufficient surface area of the mesh material to cool and quench any bursts of flame that might escape through the filter media and prevent flame from extending out beyond the sheath. The cartridge filter in this embodiment is used as a final filter for a woodshop dust collection arrangement. However, a flat filter may be used, with a suitable screen or sheath on either the entering side or the leaving side.

Figure 9:
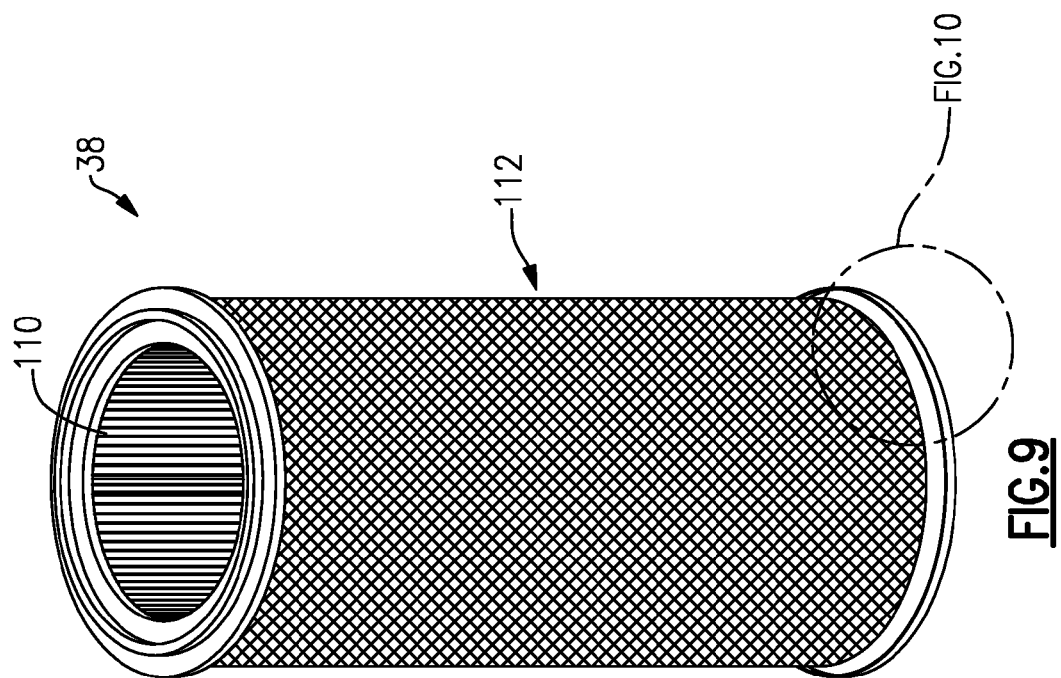
FIG. 9 is a perspective drawing of a cylindrical pleated cartridge filter, used as a final filter in this embodiment, with flame suppressor or flame quelching feature.

FIG. 9 is a perspective view of a the cartridge filter 38, and FIG. 10 is a enlargement of a portion thereof showing details of the sheath or screen that serves as the flame suppression or anti-deflagration feature. FIG. 10 shows segment of the sheath cut away to show the outer side of the pleated media, with the sheath 112 and protective cage 114 over it. There are interior pleats 110 shown here around an the open core of the filter cartridge. An outer screen or mesh sheath 112 surrounds the outer side of the pleats. The mesh material used in the sheath can be an aluminum wire mesh of 30-mesh to 40-mesh. A 40-mesh pore size will stop all flame. A 30-mesh screen will also perform excellently at blocking deflagration, but is more open and allows the filter 38 to be back-blown with compressed air for cleaning dust from the interior pleats. The sheath also has a protective metal grid or cage 114 covering the outside of the mesh screen 112, protecting it from mechanical damage. In this view, the screen mesh of the sheath 112 is not to scale.

The sheath material may alternatively be embodied as a thin metallic sheet with an array of openings or pores (i.e., narrow air flow channels) to permit normal air flow, but with sufficient metal material to absorb the heat of flame in the event of a deflagration. This material may be employed in the sheath or cover over the filter cartridge (or in the core against the inner pleats), and would quench any flame escaping (or entering) the media.

The alternative arrangement (not specifically shown) can involve a liner of a wire mesh (or perforated metal material) located on the interior of the pleated cartridge filter. This may be a cylinder of the mesh material and would be positioned at the inside pleats of the media. In such case, a deflagration would be quenched and defeated prior to entering the filter media. Other shapes of mesh sheaths can be used with other configurations of filter, i.e., flat, oval, etc.

As discussed above, in the cyclonic dust collector of this embodiment, only a small amount of dust leaves the cyclone to be picked up in the cartridge filter, and the cleaned air is then exhausted, through the filter media and the mesh screen or sheath, back to the ambient. A gravity- or spring-actuated damper can be incorporated to block any deflagration from reaching the contents of the dust collection barrel.

Operation of a dust collector of this sort reduces the amount of wood dust in the shop air, and this in itself reduces the risk of ignition of workshop dust. In the described embodiment, the sheath that surrounds the exterior (and/or interior) of the cartridge filter stops any flame or deflagration, as might occur within the ductor or the cyclonic separator, from extending out beyond the filter media into the ambient shop air. This prevents any such deflagration from causing any secondary or tertiary ignition of materials in the woodshop.

Figure 4:
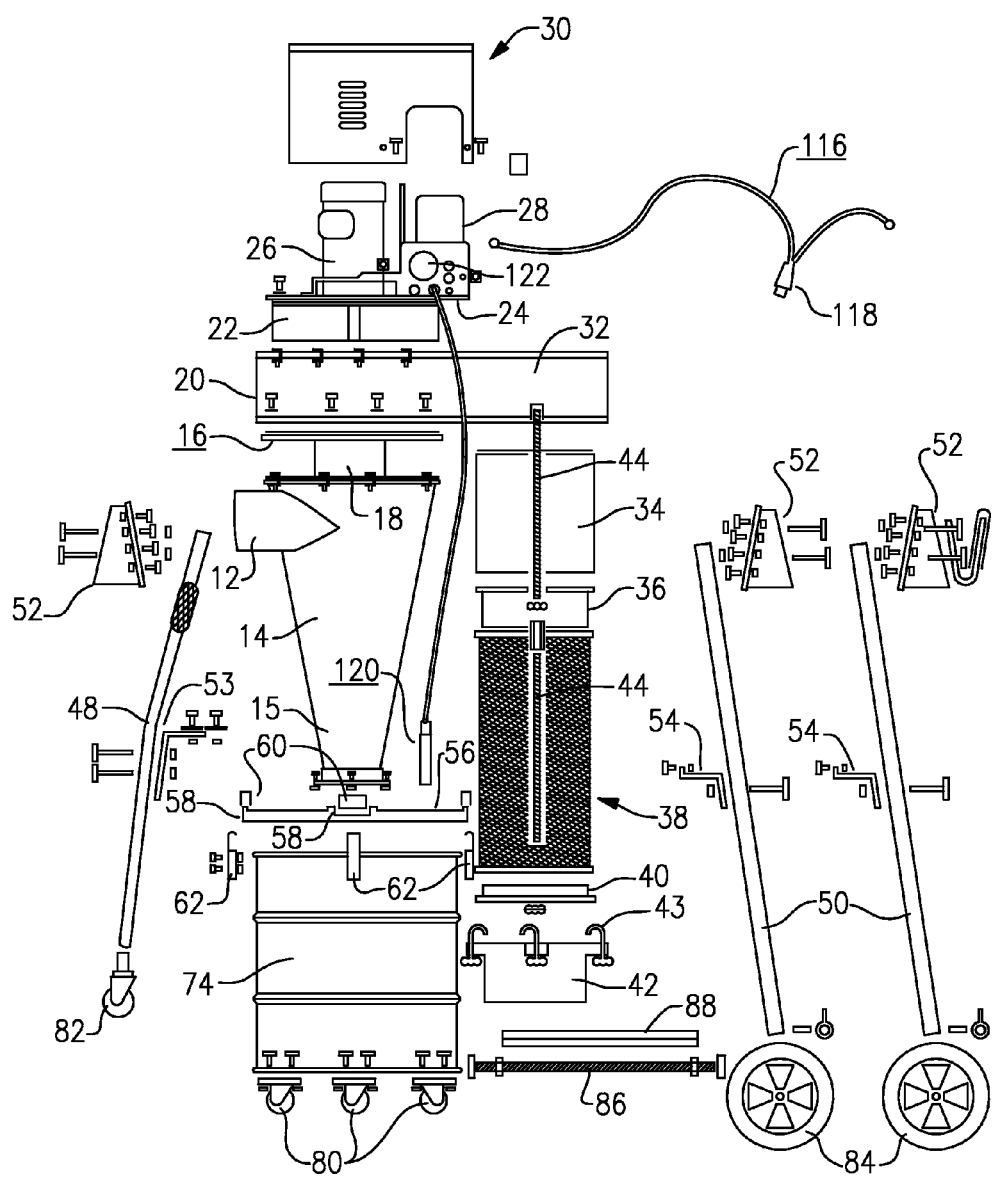
FIG. 4 is an assembly view thereof.

Returning to FIG. 4, there are a number of additional features of this embodiment which may favorably be incorporated. A grounding wire 116 is to be fastened to the motor plate and to the fan housing, and has an alligator clip 118 that attaches to the cage 114 or to the sheath 112 of the filter cartridge. A dust level sensor 120, which may be an acoustic or optical device, is mounted into the lid 56, and senses the level of the dust that has collected in the barrel. This is connected with an alarm or strobe 122 to alert the shop personnel when the dust level has risen to a full level. This feature is discussed in greater detail in pending and commonly-owned U.S. patent application Ser. No. 12/940,106, filed Nov. 5, 2010. A hook 124 for holding the power cord (not shown) is mounted at one of the rear legs 50, and a tubular hand grip 126 is positioned on the front leg 48. As seen in FIG. 4, the motor, variable speed drive, and level detector alarm may all be mounted in on place on the motor plate, with the motor, as a unit. Various fasteners, including bolts, nuts, washers, as well as various gaskets and seals, appear in FIG. 4, but are not discussed as their connections and applications would be easily understood by persons in the trade.

Not shown here is a drum liner hold-down in the form of a flat flexible resilient member, which is placed on the interior of a drum liner bag to press the drum liner out against the wall 76 of the dust collection drum 74. When the drum is full, this member is lifted out before removing the drum liner bag and closing it up. As an alternative, a vacuum-type hold-down could be used if desired.

While the invention has been described in detail with reference to one or more preferred embodiments, it should be understood that the invention is not limited to those specific embodiments, and that many modifications and variations would present themselves to persons skilled in the art without departing from the scope and spirit of the invention, as defined in the appended claims.

We claim:

1. A dust collection arrangement, comprising;
   a dust separator having an inlet port to which ducting is connected to bring a flow of air and entrained dust from one or more dust-producing tools, a separator mechanism for separating the dust from the air flow, and an exhaust for discharging the air; including a rotary impeller that is rotated by an alternating current (AC) drive motor; the impeller being adapted to induce said air flow through said ducting into and through the dust separator;

a variable speed drive having a power inlet receiving line power, and power outputs providing single phase or polyphase drive power at a drive frequency to said AC motor, including a control circuit for varying the drive frequency of the AC drive power provided by the variable speed drive;

a current sensor detecting the amount of drive current being supplied from the variable speed drive to said AC motor; and a feedback mechanism associated with the current sensor and the variable speed drive control circuit for adjusting the drive frequency of the drive power provided from the power outputs of the variable speed drive to said motor on the basis of amount of current detected by said current sensor, so as to increase or decrease the frequency such as to maintain the current at a predetermined current level.

2. The dust collection arrangement according to claim 1 wherein said dust separator comprises a cyclonic separator.

3. The dust collection arrangement according to claim 1 wherein said variable speed drive receives said line power as single phase AC power and provides three-phase AC drive power to said AC motor.

4. A dust collection arrangement wherein a cyclonic dust collection unit comprises a cyclonic separator including a conic body defining a cyclonic chamber, an inlet tube conducting an air stream with entrained dust into the cyclonic chamber, a divider plate positioned above said conic body and closing off a top of the cyclonic chamber, a vortex tube descending from a central passage of said divider plate into the cyclonic chamber, and a lower nose from which separated dust descends to exit the cyclonic chamber;

a fan chamber situated atop said divider plate, including a fan housing, a radial flow fan supported within said fan housing and generally coaxial with said vortex tube;

an alternating current (AC) induction motor connected to said fan for driving said fan to induce said air stream to flow through said inlet tube into said cyclonic chamber and then through said vortex tube into said fan chamber to flow out an exhaust duct from said fan chamber;

a variable speed drive having an inlet receiving line power, and power outlets providing alternating current (AC) drive power to said AC induction motor, the variable speed drive including a control circuit providing said AC drive power at a drive frequency, a current sensor detecting the amount of current drawn by said AC induction motor; and a feedback mechanism associated with said current sensor and the control circuit of said variable speed drive for adjusting the drive frequency of the AC drive power provided from the variable speed drive on the basis of the current detected by said current sensor, so as to increase or decrease the drive frequency of the AC drive power furnished to said AC induction motor such as to maintain the current drawn by said AC induction motor at a predetermined level.

5. The dust collection arrangement of claim 4 wherein said AC induction motor is a three-phase motor and said variable speed drive provides three-phase power to said motor as said AC drive power.

6. The dust collection arrangement according to claim 4 wherein said variable speed drive provides three-phase AC power to said motor as said AC drive power.

* * * * *